Dec. 19, 1950  D. H. RING  2,534,372
CATHODE-RAY DEVICE
Filed Nov. 19, 1948
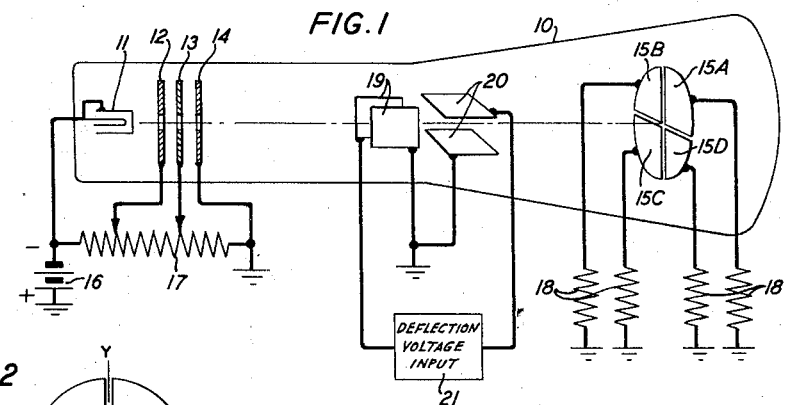
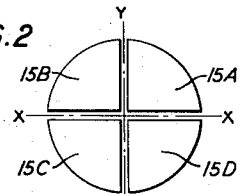
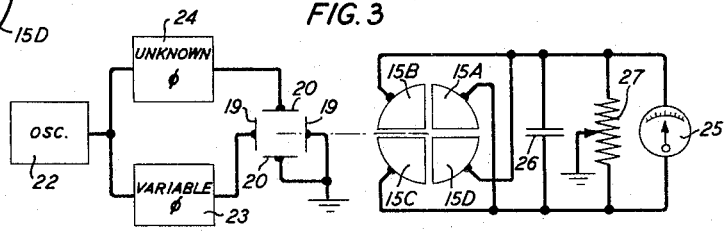
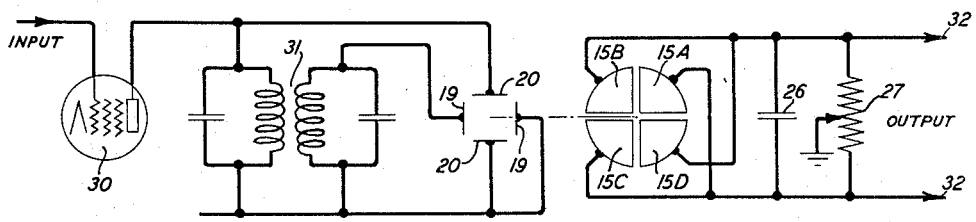
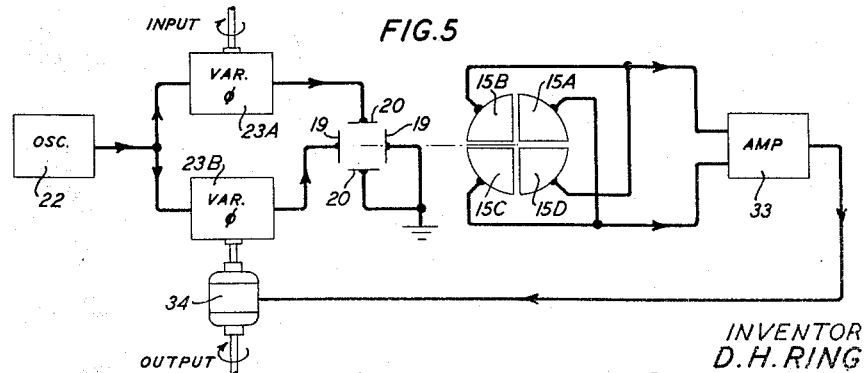
INVENTOR
D. H. RING
BY
ATTORNEY

Patented Dec. 19, 1950 2,534,372

UNITED STATES PATENT OFFICE 2,534,372

CATHODE-RAY DEVICE

Douglas H. Ring, Red Bank, N. J., assignor to Bell Telephone Laboratories, Incorporated, New York, N. Y., a corporation of New York Application November 19, 1948, Serial No. 60,887

2 Claims. (Cl. 315—21)

This invention relates to cathode-ray devices and more particularly to such devices including a plurality of targets or output electrodes.

One general object of this invention is to improve, and to increase the utility of cathode-ray devices of the multitarget type. More specific objects of this invention are to facilitate the generation of signal pulses of different repetition rates, any one of a variety of lengths or of variable length, and of constant or modulated amplitude, to simplify and improve the detection or measurement of the phase relation between the outputs of two circuits or circuit elements, and to enable the expeditious and accurate conversion of frequency modulated signals to phase or amplitude modulated signals.

In one illustrative embodiment of this invention, a cathode-ray device comprises a target structure, an electron gun for projecting a concentrated electron beam to the target structure, and means, such as two pairs of deflector plates, for deflecting the beam in two coordinate directions across the target structure.

In accordance with one feature of this invention, the target structure comprises a plurality of electrically separate electrodes constructed and arranged so that the average current to one electrode or one or more sets of the electrodes varies proportionately to the relative phase of the deflecting potentials acting upon the beam in the two coordinate directions above-mentioned.

In one specific construction, the deflecting means comprises two pairs of deflecting plates in space quadrature and the target structure comprises four sectoral or quadrant-shaped electrodes having their sides closely adjacent and extending in the two coordinate directions.

In accordance with another feature of this invention, in a device having four electrodes as described above, the electrodes are connected so that the cumulative output of the electrodes is a measure of the relative phase of deflecting potentials applied to the two pairs of deflector plates.

In accordance with a further feature of this invention, frequency modulated signals are applied to the deflecting means in such manner that the output from the target structure varies in amplitude in accordance with the frequency modulation.

The invention and the above-noted and other features thereof will be understood more clearly and fully from the following detailed description with reference to the accompanying drawing in which:

Fig. 1 is a schematic diagram showing the principal elements and the association thereof in a cathode-ray device constructed in accordance with this invention;

Fig. 2 is a face view of the target electrodes included in the device illustrated in Fig. 1;

Fig. 3 is a circuit schematic illustrating the application of a device in accordance with this invention for the determination of the phase relation between two signals;

Fig. 4 is another circuit schematic showing an FM detector including a device in accordance with this invention; and Fig. 5 is a diagram of a servo system illustrative of one embodiment of this invention.

Referring now to the drawing, the cathode-ray device illustrated in Figs. 1 and 2 comprises an evacuated enclosing vessel 10 having therein adjacent one end an electron gun which may be of conventional construction and comprises an indirectly heated cathode 11, a control electrode 12, a focussing electrode 13 and an accelerating anode 14. Opposite the electron gun is a target which comprises four identical quadrantor sector-shaped electrodes 15A to 15D inclusive arranged as illustrated in Fig. 2 and electrically separate from one another. Two pairs of deflectors 19 and 20 in space quadrature are mounted between the electron gun and the target electrodes, each pair being positioned to effect deflection of the beam in the respective coordinate direction X or Y indicated in Fig. 2.

The electrodes of the electron gun are biased at suitable potentials by way of a source 16 and potentiometer resistance 17 to project a concentrated electron beam toward the target electrode 15. Advantageously the diameter of the beam at the target electrodes is substantially equal to, preferably slightly less than, the space between adjacent target electrodes. The several electrodes are so related that normally with zero voltage on both pairs of deflector plates, at the plane of the target, the beam is centered upon the intersection of the X and Y coordinates, Fig. 2. Each of the target electrodes is connected to a load or output circuit, indicated generally by a resistor 18 in Fig. 1. Deflecting potentials, of character indicated hereinafter, are applied to the deflector plates 19 and 20 from an input circuit 21.

Salient characteristics of the device will be understood from the following considerations. If an alternating potential is impressed between the deflector plates 20, the beam will be deflected along the Y coordinate in Fig. 2, passing through the zero point, i. e. on the X axis when the potential passes through zero. Similarly, for an alternating potential applied between the deflector plates 19, the beam moves along the X coordinate and passes through the zero point, i. e. on the Y axis when the potential passes through zero. It is evident that by applying suitable potentials to both pairs of deflector plates simultaneously, the beam can be made to sweep over the targets in a variety of ways. It will pass through a zero position on the corresponding coordinate when either deflecting potential passes through zero. When the beam impinges upon any target electrode 15, a voltage is produced in the output circuit connected to that electrode. The magnitude of this voltage will be dependent upon the beam current and the load impedance. However, it is independent of the point on the target electrode upon which the beam impinges, provided, of course, the point is one such that the entire beam impinges upon the target electrode. Thus the output voltage is constant as long as the beam impinges upon only one target electrode and for an alternating current input, the output from each target sector is in the form of a rectangular pulse.

The length of the output pulse obtained from any target electrode depends upon the time the beam impinges upon that electrode. The relationship will be clear from the following analysis with particular reference to Fig. 2. Let $f$ = frequency of the applied deflecting voltages
$\varphi$ = phase difference between voltages applied to deflector plates 19 and 20
$x$ and $y$ = deflection in X and Y direction respectively
$t_1$ = time when beam is on the Y axis
$t_2$ = time when beam is on the X axis
$A$ and $B$ = constants Then, for sine wave deflecting voltages let
$$x = A \sin(\omega t - \varphi)$$
$$y = B \cos \omega t$$

At $t_1$, $x = 0$ and
$$\sin(\omega t_1 - \varphi) = 0; \quad \omega t_1 = \varphi$$

At $t_2$, $y = 0$, so that
$$\omega t_2 = \frac{\Pi}{2}$$

Hence,
$$\omega t_2 - \omega t_1 = \frac{\Pi}{2} - \varphi$$

and
$$t_2 - t_1 = \frac{1}{\omega}\left(\frac{\Pi}{2} - \varphi\right)$$

It will be noted from the foregoing that if $\varphi = 0$,
$$(t_2 - t_1) = \frac{1}{4f}$$

if
$$\varphi = \frac{\Pi}{2}, \quad (t_2 - t_1) = 0$$

and if
$$\varphi = -\frac{\Pi}{2}, \quad (t_2 - t_1) = \frac{1}{2f}$$

Thus, it is seen that the length of the output pulse $(t_2 - t_1)$ is a linear function of $\varphi$, the relative phase of the two deflecting potentials, and is independent of the relative amplitudes of $A$ and $B$. Hence, the average current in the output circuit from the target electrode is a direct measure of $\varphi$.

The above analysis deals with any one of the four target electrodes. A doubling of the average current output may be realized by using two diagonally opposite target electrodes in parallel. A further doubling can be obtained by using the two pairs of diagonally opposite target electrodes in push-pull relation. This will be understood from the following considerations. Assume that the two deflecting voltages are in phase and of equal amplitudes, and that positive deflecting potentials deflect the beam upward and to the right in Fig. 1. On the positive halves of the deflecting cycle, the beam traces a 45-degree line on the target electrode 15A; during the negative half cycles, the beam traces a 45-degree line on the target electrode 15C. Thus, pulses each of $\frac{1}{2}f$ in length are produced at each of the electrodes 15A and 15C. Both the X and Y voltages pass through zero at the same time.

Assume now that the voltage applied between deflecting plates 19 lags that applied between the deflecting plates 20. At the instant that the deflection voltage in the Y coordinate passes through zero in its positive swing, the voltage in the X coordinate will be negative and the beam will be on target electrode 15B just as the Y deflection becomes positive. The beam will not impinge upon electrode 15A until the X deflection passes through zero and it will remain upon this electrode until the Y deflection reaches zero on its swing to negative.

From a comparison of the out-of-phase with the in-phase case, it is noted that for the former, the time that the beam was directed upon target electrode 15A is reduced by the time requisite for the voltage in the X direction to reach zero after the voltage in the Y direction reached zero. Thus, the length of the output pulse is reduced in proportion to the phase shift or lag of the X voltage relative to the Y voltage. Similar results obtain with reference to target electrode 15C. Thus, the pulses obtained at target electrodes 15A and 15C are of equal lengths.

The pulses obtained at one pair of diagonally opposite target electrodes, for example 15A and 15C, are the inverse of those obtained at the other pair, e. g. 15B and 15D. Hence, to consider specific examples, if the two deflecting potentials are in phase, pulse of $\frac{1}{2}f$ length will be produced at electrodes 15A and 15C and zero pulses will be produced at electrodes 15B and 15D. If the deflecting potential between plates 19 lags that between plates 20 by 45 degrees, the pulses at electrodes 15A and 15C will be $\frac{3}{8}f$ long and those at electrodes 15B and 15D will be $\frac{1}{8}f$ long. If the lag is 90 degrees, all four electrodes 15 will produce pulses $\frac{1}{4}f$ in length.

From the foregoing, it will be appreciated that outputs of various frequencies and pulse lengths can be obtained. For example, with 90-degree phase difference in the deflecting potentials the output of any one target electrode consists of rectangular pulses of rate $f$ and length $\frac{1}{4}f$. The four target electrodes yield four sets of pulses of rate $f$, length $\frac{1}{4}f$ and displaced $\frac{1}{4}f$ in time. If adjacent target electrodes are connected together two sets of pulses of rate $f$, length $\frac{1}{2}f$ and displaced $\frac{1}{2}f$ in time can be obtained. Diagonal pairs of target electrodes connected to separate outputs yield two sets of pulses of rate $2f$, length $\frac{1}{4}f$ and displaced $\frac{1}{4}f$.

The output pulse amplitudes for the cases mentioned above are independent of the absolute and relative amplitudes of the two deflecting potentials. Thus, by the use of an appropriate filter in the output circuits, a sine wave output of frequency for $2f$ can be obtained. Also, if the beam intensity is varied by varying the potential of the control electrode 12, pulse amplitude modulated outputs are attained.

If the relative phase of the deflecting potentials is varied, pulses of rate $f$ and varying width are produced at the individual target electrodes. The individual outputs may be combined in various ways.

The device illustrated in Figs. 1 and 2 may be utilized for phase detection or measurement as illustrated in Fig. 3. As shown in this figure, the deflector plates 19 are connected to an alternating current source 22, such as an oscillator, through a variable phase shifter 23 and the deflector plates 20 are connected to the source through a circuit or element 24 of unknown phase characteristics. The diagonally opposite target electrodes 15A and 15C are connected together and to one terminal of a current or voltage indicating device such as a meter 25. The other electrodes 15B and 15D are connected to the other terminal. A condenser 26 and balancing resistance 27 are connected across the device 25 as shown, the condenser serving as a filter element so that the output current pulses are averaged.

It will be recalled that for a phase difference of 90 degrees, all four target electrodes receive pulses of equal length so that in a circuit such as illustrated in Fig. 3 a balance of the outputs of the two diagonally opposite pairs of target electrodes obtains and the meter 25 will read zero. Any change in this phase relation, then, lengthens the pulses on one set of diagonal targets and shortens the pulses on the other set. This produces an unbalance in the average meter current and both the magnitude and sense or direction of this change is indicated directly by the meter 25.

A phase measurement of an unknown element may be made in either of two ways in the circuit illustrated in Fig. 3. In one method, the system is balanced by adjustment of the known phase element 23 to give a zero meter reading with the unknown 24 shorted. The meter is then calibrated in terms of known phase shifts inserted in element 23. Then the short is removed and the phase shift of element 24 read directly on the meter. In the second method, the system is balanced as before and, then, with the unknown 24 in circuit the system is rebalanced to give zero meter reading by adjusting the element 23. The latter, properly calibrated, indicates the phase shift introduced by the unknown.

Although in the system illustrated in Fig. 3 a meter is shown as the indicating device, it will be understood that other devices may be employed. For example, an automatic recorder may be used to obtain records of phase versus frequency or some other parameter of the unknown 24.

The invention may be embodied also in FM detectors as illustrated in Fig. 4. In this figure, the electron discharge device 30 represents the last stage in an FM receiver. Its output is coupled to the deflector plates 19 and 20 by way of a tuned transformer 31 which is adjusted so that the input and output voltages thereof have a relative phase of 90 degrees at the mid-frequency in the operating band. The phase relation between these voltages will vary with frequency and the output at terminals 32 will vary accordingly. The conversion of frequency modulation to phase modulation to output variation may be made linear and independent of the amplitude of the output of the receiver 30.

In the servo system illustrated in Fig. 5, two variable phase shifters 23M and 23B are provided between the oscillator 22 and the deflector plates 19 and 20. The output from the target electrodes is supplied to an amplifier 33 to control a motor 34 which drives the phase shifter 23B. As is clear from what has been said hereinabove, when the relative phase of the potentials between the deflector plates 19 and 20 is 90 degrees, the net output from the target electrodes is zero. Any change from this relation, effected, for example, by adjustment of element 23A will result in an output current of amplitude proportional to the change. Thus, the motor 34 will exactly follow any variation in the phase shifter 23A.

Although specific embodiments of the invention have been shown and described, it will be understood that they are but illustrative and that various modifications may be made therein without departing from the scope and spirit of this invention.

What is claimed is:

1. Electron discharge apparatus comprising two circuit elements of variable phase characteristics, means for applying signals of the same frequency to said elements, means for resolving the outputs of said elements into a control signal of amplitude proportional to the relative phase of said outputs, said resolving means comprising target means including an electrode having two intersecting sides extending in coordinate directions, means for projecting an electron beam toward said electrode and directed to a region adjacent the intersection of said sides, a first deflection means energized in accordance with the output of one of said elements for sweeping said beam in one of said coordinate directions and a second deflection means energized in accordance with the output of the other of said elements for sweeping said beam in the other of said coordinate directions, means for varying the phase of the output of one of said elements, and means controlled in accordance with said control signal for adjusting the phase of the output of the other of said elements.

2. Electron discharge apparatus comprising two circuit elements of variable phase characteristics, means for applying signals of the same frequency to said elements, means for resolving the outputs of said elements into a control signal of amplitude proportional to the relative phase of said outputs, said resolving means comprising four target electrodes mounted in laterally adjacent relation in the four quadrants of a circle and having their adjacent sides extending from the center of said circle and parallel to two orthogonally related diameters of said circle, means opposite said electrodes for projecting an electron beam thereto, means for sweeping said beam in the direction parallel to one of said diameters, in accordance with the output of one of said elements, means for sweeping said beam in the direction parallel to the other of said diameters, in accordance with the output of the other of said elements and means for combining the currents to diagonally opposite pairs of said electrodes to produce said control signal, means for varying the phase of the output of one of said elements, and means for adjusting the phase of the output of the other of said elements proportionately to the amplitude of said control signal.

DOUGLAS H. RING.

REFERENCES CITED

The following references are of record in the file of this patent:

UNITED STATES PATENTS

| Number | Name | Date |
| --- | --- | --- |
| 2,344,679 | Crosby | Mar. 21, 1944 |
| 2,438,928 | Labin et al. | Apr. 6, 1948 |
| 2,445,964 | Owen | July 27, 1948 |